US011963572B2

(12) United States Patent
Haristos et al.

(10) Patent No.: US 11,963,572 B2
(45) Date of Patent: Apr. 23, 2024

(54) APPARATUS TO ACQUIRE AND PROCESS IMAGES FOR A HELMET, CORRESPONDING HELMET AND METHOD TO ACQUIRE AND PROCESS IMAGES

(71) Applicant: ZERONOISE LTD, Oxted (GB)

(72) Inventors: Alexandros Haristos, Amsterdam (NL); Stephane Cohen, Msida (MT)

(73) Assignee: ZERONOISE LTD, Oxted (GB)

( * ) Notice: Subject to any disclaimer, the term of this patent is extended or adjusted under 35 U.S.C. 154(b) by 231 days.

(21) Appl. No.: 17/433,929

(22) PCT Filed: Feb. 26, 2019

(86) PCT No.: PCT/EP2019/054764
§ 371 (c)(1),
(2) Date: Aug. 25, 2021

(87) PCT Pub. No.: WO2020/173555
PCT Pub. Date: Sep. 3, 2020

(65) Prior Publication Data
US 2022/0047035 A1 Feb. 17, 2022

(51) Int. Cl.
| A42B 3/30 | (2006.01) |
| H04N 5/38 | (2006.01) |
| H04N 5/77 | (2006.01) |
| H04N 21/2187 | (2011.01) |
| H04N 23/10 | (2023.01) |
| H04N 23/57 | (2023.01) |
| H04N 23/65 | (2023.01) |
| H04N 23/50 | (2023.01) |

(52) U.S. Cl.
CPC ............... *A42B 3/30* (2013.01); *H04N 5/38* (2013.01); *H04N 5/77* (2013.01); *H04N 21/2187* (2013.01); *H04N 23/10* (2023.01); *H04N 23/57* (2023.01); *H04N 23/65* (2023.01)

(58) Field of Classification Search
CPC . A42B 3/30; A42B 3/042; H04N 5/38; H04N 5/77; H04N 21/2187; H04N 23/10; H04N 23/57; H04N 23/65
See application file for complete search history.

(56) References Cited

U.S. PATENT DOCUMENTS 6,493,136 B2 * 12/2002 Chang .................. G02B 25/004
351/59
8,001,623 B2 * 8/2011 Gertsch .................. A42B 3/042
2/410

(Continued)

FOREIGN PATENT DOCUMENTS

| DE | 19542835 A1 | 5/1997 |
| WO | 2006127940 A1 | 11/2006 |
| WO | 2020173555 A1 | 9/2020 |

OTHER PUBLICATIONS

International Search Report and Written Opinion for PCT/EP2019/054764, dated Nov. 27, 2019, 12 Pages.

*Primary Examiner* — Robert H Muromoto, Jr.
(74) *Attorney, Agent, or Firm* — Maine Cernota & Curran

(57) ABSTRACT

An apparatus to acquire and process images for a helmet, including an image acquisition device provided with a sensor, in embodiments including a helmet on which the image acquisition device is installed, and a the related method of acquiring and processing images therefrom.

16 Claims, 3 Drawing Sheets

(56) References Cited

U.S. PATENT DOCUMENTS

| | | | |
|---|---|---|---|
| 8,730,388 B2* | 5/2014 | Osborn | H04N 5/77 348/47 |
| 9,154,676 B1* | 10/2015 | Musec | H04N 23/57 |
| 9,209,888 B2* | 12/2015 | Smith | H04W 52/265 |
| 9,219,768 B2* | 12/2015 | Hobby | G06Q 30/0603 |
| 9,389,677 B2* | 7/2016 | Hobby | G06F 3/005 |
| 9,432,565 B2* | 8/2016 | Martin | H04N 23/50 |
| 9,451,802 B2* | 9/2016 | Shearman | H04N 5/91 |
| 9,955,108 B2* | 4/2018 | Isaac-Lowry | H04N 23/57 |
| 10,051,909 B2* | 8/2018 | Zhang | A42B 3/0426 |
| 10,098,401 B2* | 10/2018 | Weller | A42B 3/042 |
| 10,257,434 B2* | 4/2019 | Arnold | A42B 3/042 |
| 10,324,290 B2* | 6/2019 | Weller | A42B 3/0426 |
| 10,542,222 B2* | 1/2020 | Arnold | A42B 3/30 |
| 10,786,033 B2* | 9/2020 | Brown | A42B 3/30 |
| 10,887,557 B2* | 1/2021 | Benjamin | H04N 7/183 |
| D920,635 S * | 6/2021 | Douramakos | D2/866 |
| 11,112,059 B2* | 9/2021 | Sun | H04N 23/57 |
| 11,245,831 B2* | 2/2022 | Bunn | H04N 23/66 |
| 11,559,099 B2* | 1/2023 | Bartels | A42B 3/042 |
| 2001/0038491 A1* | 11/2001 | Fergason | G02B 30/34 359/465 |
| 2002/0186180 A1* | 12/2002 | Duda | G06F 1/163 345/8 |
| 2005/0174470 A1* | 8/2005 | Yamasaki | H04N 23/635 348/E5.025 |
| 2006/0277666 A1* | 12/2006 | Gertsch | A42B 3/04 2/424 |
| 2008/0247744 A1* | 10/2008 | Une | G03B 17/24 396/310 |
| 2010/0289914 A1* | 11/2010 | Shinomiya | H04N 9/7921 348/222.1 |
| 2011/0059628 A1* | 3/2011 | Chen | H01R 27/02 439/61 |
| 2012/0188450 A1* | 7/2012 | Lynn | H04B 1/3805 348/E7.001 |
| 2012/0198603 A1* | 8/2012 | Gertsch | A42B 3/30 2/410 |
| 2013/0155244 A1* | 6/2013 | O'Rourke | G02B 27/0176 348/158 |
| 2014/0013024 A1* | 1/2014 | Lamm | H01R 31/06 710/313 |
| 2014/0092299 A1* | 4/2014 | Phillips | G03B 17/566 348/376 |
| 2014/0249368 A1* | 9/2014 | Hu | A61B 1/04 600/109 |
| 2001/4362244 | 12/2014 | Martin | |
| 2014/0362244 A1* | 12/2014 | Martin | H04N 23/65 348/211.2 |
| 2015/0229813 A1* | 8/2015 | Isaac-Lowry | H04N 23/55 348/376 |
| 2017/0140666 A1* | 5/2017 | Kennair, Jr. | G09B 9/063 |

\* cited by examiner

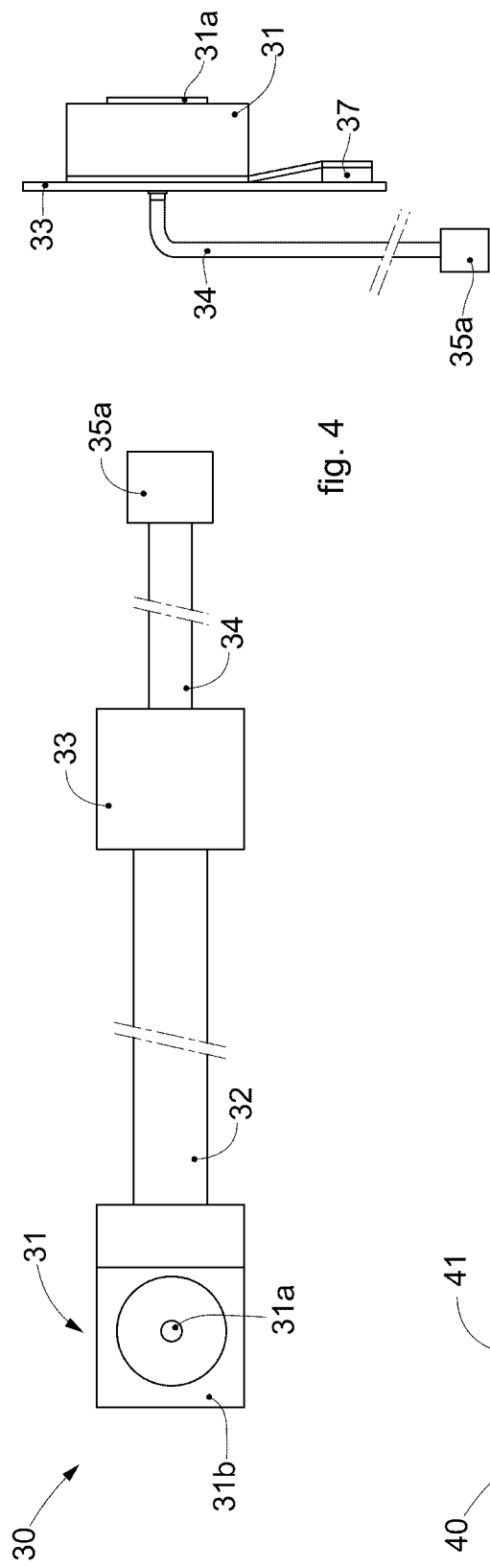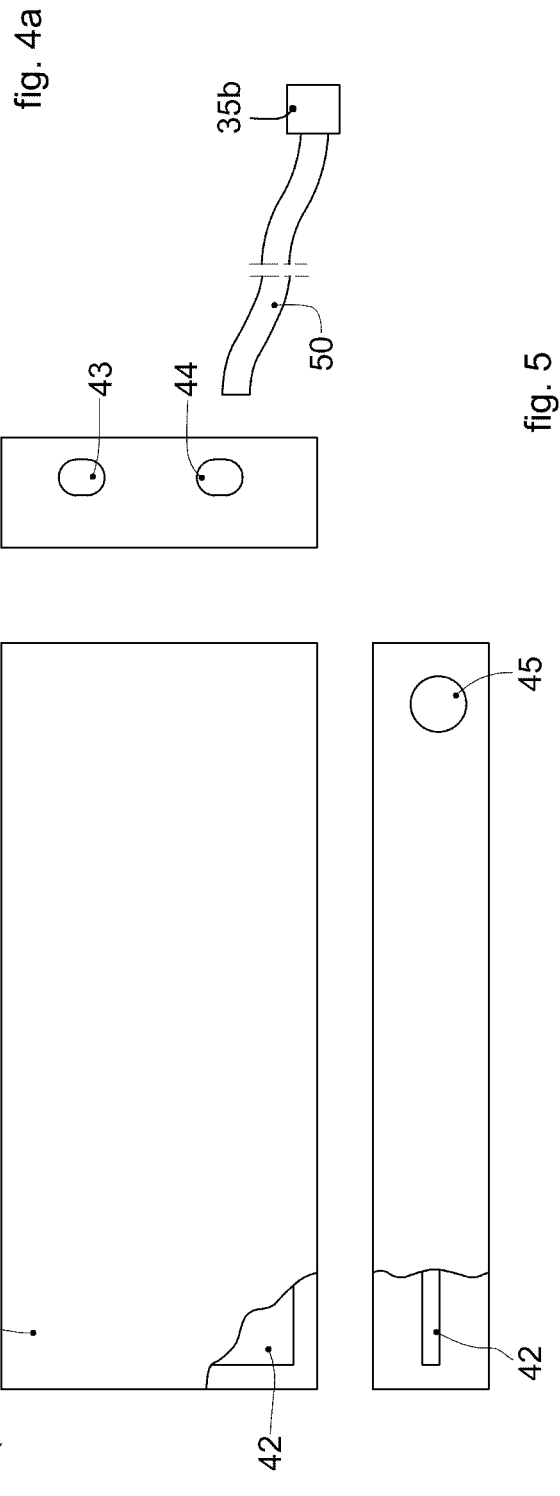

APPARATUS TO ACQUIRE AND PROCESS IMAGES FOR A HELMET, CORRESPONDING HELMET AND METHOD TO ACQUIRE AND PROCESS IMAGES

RELATED APPLICATIONS

This application is a national phase application filed under 35 USC § 371 of PCT Application No. PCT/EP2019/054764 with an International filing date of Feb. 26, 2019. This application is herein incorporated by reference, in its entirety, for all purposes.

FIELD OF THE INVENTION

The present invention concerns an apparatus to acquire and process images that can be used and installed on a helmet. The invention also concerns the corresponding helmet, as well as a method to acquire images from a helmet, to process them and convert them into video signals, which can be transmitted, for example, but not only, to a live TV center for their diffusion and reproduction.

BACKGROUND OF THE INVENTION

The use of protective helmets is known in situations where accidents can occur that can produce impacts or knocks, even very violent, on the user's head.

Such situations can happen, for example, in the case of sporting events, where critical situations may occur, such as performances that entail high speeds. Non-restrictive examples can be motor racing, motorcycling and cycling competitions, skiing and winter sports in general, American football or other competitive activities in which a helmet protects the user from impacts that are potentially very dangerous for his/her safety.

It is also known that often such helmets can provide additional purposes and/or functions other than the protection for which they were originally developed.

In particular, in recent years the structural and design complexity of helmets, both sporting and non-sporting, has been increasing, with the integration of many technologies inside them.

For example, in the patent documents EP2674048 and EP1099390, helmets for sports competitions are shown, inside which are integrated, respectively, acoustic communication devices and intercom equipment.

In another example, patent document U.S. Pat. No. 9,432,565 shows a video recording device positioned outside a helmet for sports competitions.

A particularly critical case of sporting events involving high-speed performance and requiring the use of highly sophisticated protection helmets are motorcar races or motorcycle races.

In these cases, the user of the helmet may be the driver of the vehicle (for example, a motor vehicle or a motorcycle) and/or a passenger.

It is also known that, often, sporting events of this type are filmed to be broadcast on live TV, via streaming, or on the internet through suitable channels.

In these cases, it is important to be able to acquire high quality images and videos from the perspective of the vehicles racing, both for the purposes of live transmission and for monitoring and controlling the progress of the event.

For example, in the case of motorcar and motorcycle races, it is known to use cameras mounted on the vehicles.

A step towards better image acquisition was to install a camera directly on the driver's helmet.

However, when electronic or other devices are integrated into high-performance sports helmets, significant technical problems arise.

First of all, when the camera is moving, possibly at high speed, on tortuous routes that include sudden curves, or sudden accelerations and decelerations, the quality of the images may not be adequate.

To provide high quality images, and to better appreciate the details of the competitive event, it is necessary to acquire such images at high frequency and high resolution.

The acquisition of high resolution images typically requires complex electronics, due to the large amount of data acquired by the camera, and the need to send data to suitable receivers.

For this reason, typically the cameras or video sensors of known devices, in reality, are complex components, which can comprise, as well as optical elements, such as for example lenses, also electronic components, such as sensor boards for example, to transform the optical signals acquired into electronic signals, preprocessing boards, to pre-process the raw data, and serialization boards, to serialize the raw data in a serialized data stream, which can also be transferred over long distances, for example through coaxial cables.

Consequently, known image acquisition devices, possibly high resolution and high frequency, are typically very delicate and/or quite bulky.

Moreover, often the images acquired have to be digitally processed before being sent on live TV, and this requires the presence of additional suitable electronic components that can create a significant bulk and are difficult to install and manage.

In some cases, it is preferred to install such devices outside the helmet, for example as shown in document U.S. Pat. No. 9,432,565.

However, this solution has the disadvantage that the device can become detached in the event of accidents, impacts or knocks, and is therefore a danger to the safety of the user.

This solution also has the disadvantage that the device, during use at high speed, could cause significant aerodynamic stresses on the vehicle, or could become detached from the helmet.

Furthermore, devices installed outside the helmet, or on the vehicle, can supply images and videos from perspectives that are inadequate to correctly film the sporting competition.

It is also known that in all these cases the safety of the driver, or in general of the wearer of the helmet, must remain a priority, and therefore said devices must not and cannot affect individual safety performance. Furthermore, the presence of such devices associated with the helmet must in no way interfere, not even potentially, with the absolute freedom of movement and the complete functioning of the user.

One purpose of the present invention is to allow to acquire images and/or videos from a perspective as close as possible to that of the driver's eyes, so as to accurately reproduce his/her field of vision.

Another purpose of the present invention is to allow to acquire such images at high quality even in conditions of high speed, tortuous routes, sudden accelerations and decelerations.

Another purpose of the present invention is to process said images in real time in order to allow them to be transmitted live on TV or in other channels via streaming or on the internet.

Finally, another purpose of the present invention is to guarantee the maximum level of safety for the user of the helmet, who may possibly be a driver of a sports vehicle.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

The present invention concerns an apparatus to acquire and process images.

According to the present invention, the image acquisition and processing apparatus can be installed in a helmet and comprises an image acquisition device and an image processing device.

In a known manner, the helmet comprises a shell, a liner and at least one aperture so that the user can see.

The liner has a thickness in substantial correspondence with the aperture for the user's eyes.

The image acquisition device according to the invention comprises at least one sensor to acquire images and signal transmission means to send video signals to the image processing device.

According to one aspect of the present invention, the sensor and the image transmission means are mounted substantially integrally inside the helmet.

According to one embodiment, the sensor can comprise a video camera or other mean suitable to acquire images and/or videos, possibly at high frequency and high definition.

This allows to guarantee a high quality of the image even during movement, possibly at high speed, and/or on tortuous routes that have sudden curves and sudden accelerations and decelerations.

Moreover, the present invention provides greater freedom of positioning of the sensor with respect to other apparatuses of the state of the art, as well as a minimum or non-existent invasiveness of the apparatus with regard to the normal and free operation of the user.

According to one aspect of the present invention, the sensor is positioned in association with the thickness of the liner, in a position suitable to allow images to be acquired substantially at the level of the user's eyes.

This specific positioning of the sensor in the helmet allows to record images and/or videos substantially from the perspective of the user's field of vision.

This characteristic allows to overcome the disadvantage of the state of the art whereby images and videos acquired from devices installed outside the helmet, or on the vehicle, can provide images from perspectives that are inadequate to correctly film the performance of the sporting competition.

According to one embodiment of the present invention, the signal transmission means are entirely contained inside the shell of the helmet.

This characteristic allows to reduce the aerodynamic stresses on the vehicle, it prevents any possible accidental detachment of the image acquisition device and improves the safety of the helmet.

In general, the layout, or spatial distribution, of the image acquisition device inside the helmet allows to overcome the disadvantages of the state of the art connected with the use of image acquisition devices outside the helmet, such as for example the possibility of having significant aerodynamic stresses or the risk that parts of it are detached from the helmet.

In some embodiments, the signal transmission means can comprise a flat cable and a serialization board, which can both be mounted inside the helmet, for example between the shell and the liner, and a connection cable, whose first end is connected to the serialization board and whose second end protrudes outwards from the helmet.

In other embodiments, the signal transmission means can comprise a serialization board, onto which the sensor is mounted, and a connection cable, which can be mounted inside the helmet and which is substantially contained inside the helmet, whose first end is connected to the serialization board and whose second end protrudes outwards from the helmet.

These characteristics have the advantage that the image acquisition device can be installed in the helmet without modifying any component of the helmet either structurally or aesthetically.

This allows to install the same apparatus on many different types of helmets, without the need to make structural or aesthetic changes to the helmet itself and without particular restrictions on the type of helmet on which the equipment can be installed.

Another advantage is that the image acquisition device can be easily removed and reinserted into the helmet, facilitating maintenance operations and the replacement of components in the event of breakage or malfunction.

In some embodiments of the present invention, the serialization board is connected to the image processing device by means of a coaxial cable.

The image processing device can comprise a processing board, for example, suitable to process the images received from the sensor, converting them into video data, and to manage the electric power supply and the functioning of all the components of the apparatus.

The fact that the serialization board is inside the helmet, and consequently the data exiting from the helmet are already serialized, allows to be able to position the image processing device in any advantageous position of the vehicle, for example the position that interferes least with the normal operations of the user.

This characteristic allows to overcome the disadvantage of the state of the art whereby the presence of electronic components can create a significant bulk in the vehicle, and a limit, even only theoretical and potential, to the absolute freedom of movement of the user.

According to one embodiment, the processing board can be suitable to memorize video data on a removable support.

According to one embodiment, the processing board can be suitable to transmit the video data to a live TV control center, in a format suitable for direct TV.

The present invention also concerns a method to acquire and process images.

The method provides to acquire images from the sensor, installed in the helmet, in a suitable position to acquire images substantially at the level of the user's eyes.

The method also provides to process the images acquired by the sensor, converting them into a video signal format, suitable to be transmitted on live TV.

The method of the present invention comprises the steps of:

acquiring images, producing raw signals in output;
serializing the raw signals, producing in output a stream of serialized signals that can be transmitted even to long distances;
deserializing the stream of serialized signals and processing the signals, producing video signals in output.

The invention also concerns the helmet used in said apparatus.

BRIEF DESCRIPTION OF THE DRAWINGS

These and other characteristics of the present invention will become apparent from the following description of some embodiments, given as a non-restrictive example with reference to the attached drawings wherein:

FIG. 4 is a schematic representation of a component of the apparatus in FIG. 1;

FIG. 4a is a schematic representation of an alternative embodiment of the component shown in FIG. 4;

FIG. 5 is a schematic representation of one embodiment of a component of the apparatus in FIG. 1.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Figure 1:
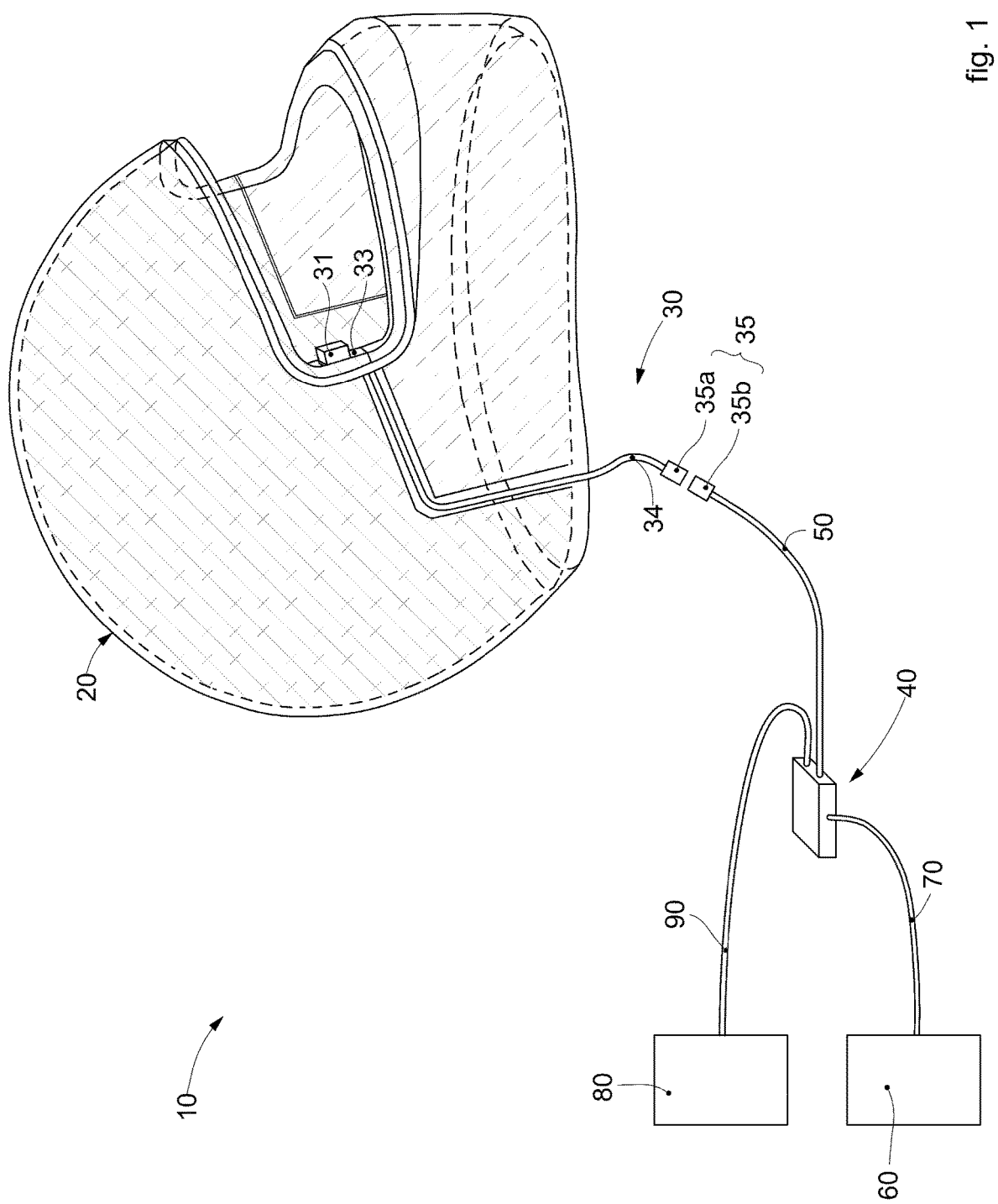
FIG. 1 is a schematic representation of one embodiment of the apparatus to acquire and process images according to the present invention.

FIG. 1 shows an embodiment of an image acquisition and processing apparatus 10 (hereafter apparatus 10), which can be installed in a helmet 20, according to the present invention.

The apparatus 10 comprises, as its main components, an image acquisition device 30, an image processing device 40 and a data transmission cable 50, schematically shown in the drawings.

The acquisition device 30, during use, can be installed inside the helmet 20.

The acquisition device 30 is connected, in this case, to the processing device 40 through the data transmission cable 50.

In one embodiment, the data transmission cable 50 is a coaxial cable.

The processing device 40 can be connected to an electric power source 80, for example a 12V DC power supply, through a power supply cable 90.

In some embodiments, such as the one shown in FIG. 1, the processing device 40 is connected to a receiver 60 through a video transmission cable 70.

The receiver 60 can be, for example, a live TV transmission unit installed on board the vehicle (on-board broadcasting processing unit), which can transmit the video data to a live TV control center (or broadcasting center). In these cases, typically, the receiver 60 is provided by the live TV control center.

According to the present invention, as will be clear hereafter, there are no particular restrictions on the type of helmet 20 on which the acquisition device 30 can be installed.

The helmet 20 can therefore be the integral, jet, semi-jet, modular, or other type.

For the purposes of the description, hereafter and in the drawings we will refer to an integral helmet, of a type typically used in motor sport and motorcycle competitions. Although the use of the present invention for this type of application is particularly advantageous, this should not be considered as a limiting factor.

The helmet 20, without the acquisition device 30, will therefore be considered as known to the person of skill in the art in its main components, and only the components necessary for the description of the invention will be explicitly mentioned.

Figure 3:
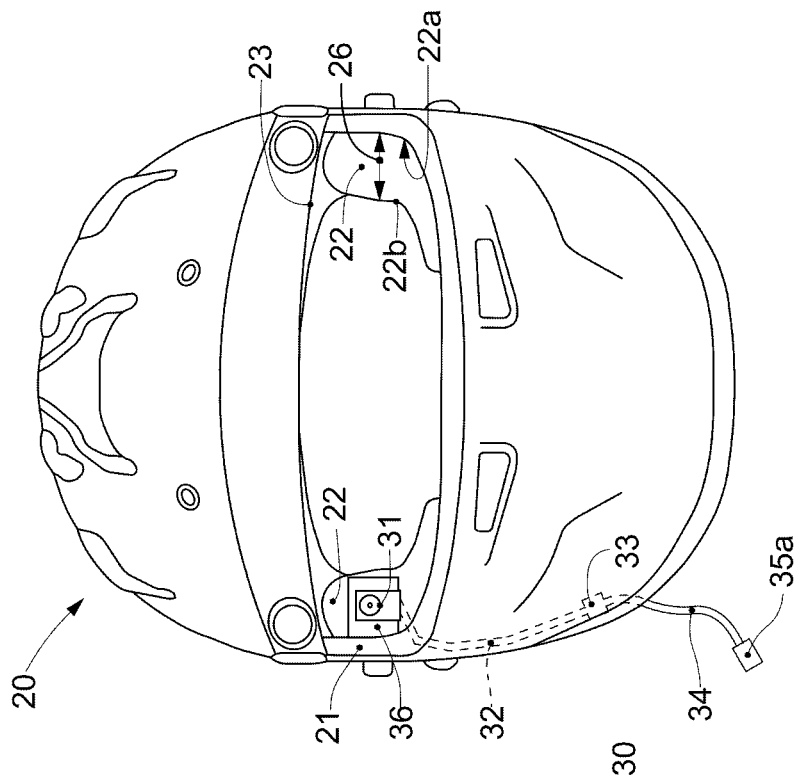
FIG. 3 is a front view of the helmet in FIG. 2.
Figure 2:
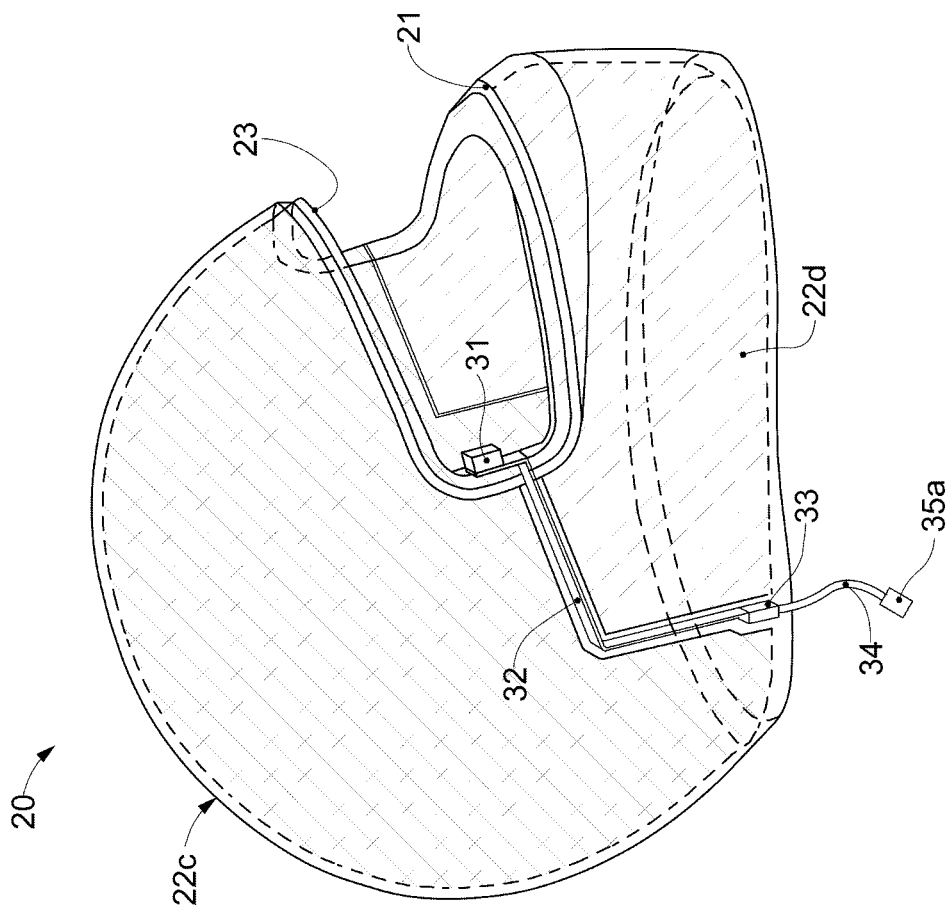
FIG. 2 is a lateral view of the helmet in FIG. 1.

As shown by way of example in FIGS. 1, 2 and 3, the helmet 20 comprises, in general terms, a shell 21 and a liner 22.

The shell 21, in a known manner, typically consists of materials suitable to protect the user's head from possible impacts or knocks.

The shell 21 normally comprises one or more apertures, to allow the user to insert his/her head and to guarantee the user a sufficient field of vision.

In the embodiment of the helmet 20 shown in FIGS. 1 and 2, the shell 21 has an aperture for the head and an aperture for the eyes 23.

The liner 22, also known, can be formed of one or more different materials, and can comprise one or more different layers.

For example, the liner 22 can comprise a protective layer, which absorbs energy deriving from impacts or knocks, and a softer layer suitable to provide comfort for the wearer.

The liner 22 can also comprise a layer of fire-resistant material (fire-resistant fabric).

In the example shown in FIGS. 1 and 2, the liner 22 substantially consists of an upper liner 22c and a lower liner 22d, joined together at the height of the aperture for the eyes 23. This characteristic can be advantageous, for example, if it is desired to use different materials for different zones of the helmet 20.

The external surface 22a and the internal surface 22b of the pad 22 define a thickness 26, not necessarily constant.

It is therefore possible to associate at each point of the internal surface of the shell 21 a certain value of thickness 26 of the liner 22.

In FIG. 3 a portion of liner 22 is visible on the front side of the helmet 20, in correspondence with the aperture for the eyes 23, the thickness of which 26 has been indicated with a double arrow on the right side of the image.

The acquisition device 30 comprises a video type sensor 31 and signal transmission means.

The signal transmission means comprise electronic components able to transmit the signal acquired by the sensor 31 to the processing device 40.

In some embodiments, the signal transmission means can transmit the signal using wireless technology.

FIG. 4 shows schematically an embodiment of an acquisition device 30, not installed in the helmet 20.

In this embodiment, the acquisition device 30 comprises the sensor 31, while the signal transmission means comprise a flat cable 32, a serialization board 33 and a connection cable 34.

According to alternative embodiments of the acquisition device 30, described by FIG. 4*a*, the sensor 31 is mounted directly on the serialization board 33, and the flat cable 32 is not present. In this case, the signal transmission means comprise the serialization board 33 and the connection cable 34.

Other embodiments of the acquisition device 30, also described by FIG. 4*a*, comprise a brightness sensor 37, provided in addition to the main sensor 31, to tune the brightness of the images acquired by the sensor 31.

In some embodiments, both the sensor 31 and the brightness sensor 37 may be mounted on the serialization board 33.

In some embodiments, the sensor 31 can comprise a lens 31*a* and a sensor board, or preprocessing board 31*b*, suitable to manage the functioning thereof and to transform optical information into electronic information.

The sensor 31 can comprise a camera or other suitable means to acquire images and/or videos, possibly also at high frequency and/or at high resolution.

In some embodiments, the sensor 31 is based on Color CMOS (Complementary Metal Oxide Semiconductor) technology.

In some embodiments, the sensor 31 is able to acquire images and/or videos at a resolution equal to or greater than 4224×3136 pixels.

In some embodiments, the first end of the connection cable 34 is connected to the serialization board 33, possibly by means of a suitable connector, while the second end is suitable to be connected to the data transmission cable 50.

In some embodiments, the connection cable 34 can be a coaxial cable.

In some embodiments, the connection between the connection cable 34 and the data transmission cable 50 is obtained by means of a rapid release device 35.

In these embodiments, such as the one shown by way of example in FIG. 4, the rapid release device 35 comprises an interface portion, for example a male connector 35*a*, mounted on the second end of the connection cable 34, and a complementary interface portion, for example a female connector 35*b*, mounted on the end of the data transmission cable 50.

The rapid release device 35 is suitable to disconnect the data transmission cable 50 immediately and automatically from the connection cable 34, in the event that excessive stress, or strain, occurs between said components 34, 50.

Advantageously, this guarantees that in the event of an emergency the user can detach the helmet 20 from the image processing device 40 quickly, without using his/her hands and without encountering significant resistance, so as to exit the vehicle quickly and without effort.

According to the present invention, the serialization board 33 is suitable to manage the serialization of the images acquired by the sensor 31.

In some embodiments the acquisition device 30 can be coated with a fire-resistant material.

In some embodiments, the largest size of the sensor 31 can be comprised between 20 and 25 mm, while the second size can be less than 15 mm.

FIGS. 1, 2 and 3 show, in a perspective and front view, an embodiment of the acquisition device 30, installed inside the helmet 20.

In the embodiment of FIGS. 2 and 3, the sensor 31 is inserted in a support 36, which can be made of the same material with which the liner 22 is made.

In some embodiments, the support 36 can have the largest size comprised between 30 and 20 mm, the second size comprised between 25 and 15 mm and the third size comprised between 5 and 2 mm, and preferably can be a parallelepiped with sizes of 25×20×2.4 mm.

In some solutions, the support 36 can have a central hole to allow the insertion of the sensor 31 or part of the sensor 31.

In other embodiments, for example those comprising the brightness sensor 37, the support 36 can have two holes, to allow the insertion of both the sensor 31, or part of the sensor 31, and the brightness sensor 37, or part of the brightness sensor 37.

The support 36, with the sensor 31 and possibly the brightness sensor 37 inserted, can be attached on the liner 22 of the helmet 20 in the desired position, for example by means of double-sided adhesive tape.

In some embodiments of the present invention, the sensor 31 and possibly the brightness sensor 37 are positioned on the thickness 26 of the liner portion 22 of the front side of the helmet 20, in correspondence with the aperture for the eyes and in a position suitable to acquire images substantially at the level of the user's eyes.

In the embodiment shown in FIGS. 1, 2 and 3, the second end of the connection cable 34 protrudes from the base part of the helmet 20, slightly behind the base of the chin guard.

In this embodiment, the second end of the connection cable 34 protrudes from the helmet 20 for a portion sufficient to allow the connection with the data transmission cable 50.

It is obvious that the precise position of the second end of the connection cable 34 can be varied according to the type of helmet 20, the configuration of the vehicle, or according to preferences or requirements, without departing from the field of the present invention.

In some embodiments of the present invention, for example described by FIG. 2, the flat cable 32 is positioned between the liner 22 and the shell 21.

In the embodiment shown in FIG. 2, the flat cable 32 is housed in a seating made in an interface between the upper liner 22*a* and the lower liner 22*b*.

Analogously, in the embodiments where the flat cable 32 is not provided, for example that described by FIG. 1, the connection cable 34 is housed in a seating made in the interface between the upper liner 22*a* and the lower liner 22*b*.

In some embodiments, the flat cable 32 and/or the connection cable 34 are attached to the shell 21 by double-sided adhesive tape.

It is obvious from the present description that it is possible to obtain a housing seating for the flat cable 32 and/or for the connection cable 34 also when the liner 22 is made as a single piece, or also when the liner 22 is made as a plurality of pieces.

In some embodiments, the processing device 40 can be located inside or outside the helmet 20.

In the embodiment shown in FIG. 5, the processing device 40 comprises a box 41, inside which an image processing board 42 is contained, provided with connectors 43, 44, 45 for connection with the other components of the apparatus 10 or with external devices.

In the embodiment shown in FIG. 5, a power connector 43, an in-connector 44 and an out-connector 45 are provided.

In this embodiment, the data transmission cable 50 can be connected to the in-connector 44.

In this embodiment, the supply cable 90 can be connected to the power connector 43.

In this embodiment, the video transmission cable 70 can be connected to the out-connector 45.

In one embodiment, the largest size of the box 41 is less than 160 mm.

In this embodiment, the second size of the box 41 is less than 60 mm.

In this embodiment, the third size of the box 41 is less than 25 mm.

The processing device 40 can be located at a variable distance from the helmet 20, and the length of the transmission cable 50 can be adapted accordingly.

In some cases it is possible that as the length of the transmission cable 50 increases, the image is degraded. However, Applicant has found that it is possible to use transmission cables 50 up to 10 m long without any degradation of the image quality.

The processing board 42 is suitable to process the images received from the sensor 31, converting them into video signals, and managing the power supply and operation of all the components of the apparatus 10.

In some embodiments, the processing board 42 is also suitable to manage the deserialization of the video signals acquired from the sensor 31.

In some embodiments, a special deserialization board can be provided in the processing device 40.

In other embodiments, the deserialization board can be printed in a single circuit on the processing board 42.

The electric supply and the control signals necessary for the operation of the entire acquisition device 30 can therefore be transmitted on the data transmission cable 50, in addition to the signals relating to the images acquired by the sensor 31.

In some embodiments, the processing board 42 is suitable to memorize the video data on a removable support. For example, the removable support, not shown in the drawings, can be an SD/MICROSD board. In this case the processing board 42 can be suitable to process the signals in a compressed H264/H265 format, in quality equal to or higher than 1080p 60 fps.

In some embodiments, the processing board 42 is suitable to transmit the video data to a live TV control center, in a format suitable for live TV.

In some embodiments, the processing board 42 can comprise a chip with Field Programmable Gate Array (FPGA) technology.

In one embodiment, the video transmission cable 70 can be a coaxial cable.

In one embodiment, the video transmission cable 70 can have a coaxial output.

In some embodiments, the apparatus 10 of the present invention can therefore be installed inside the helmet 20 by means of the following steps:
  detaching the liner 22 from the shell 21;
  installing the sensor 31 on the support 36;
  attaching the support 36 to the liner 22;
  attaching the flat cable 32 and/or the connection cable 34 to the shell 21;
  reinserting the liner 22 in the shell 21, making sure that at least the male connector 35a of the rapid release device 35 is accessible from outside the helmet 20, for connection with the data transmission cable 50;
  positioning the processing device 40 inside the vehicle;
  connecting the acquisition device 30 to the processing device 40;
  connecting the processing device 40 to the power supply 80 and possibly also to the receiver 60;
  activating the power supply 80;
  switching on the processing device 40.

The present invention also concerns a helmet 20 in which the acquisition device 30 is installed, as shown in the embodiments described above and shown in the drawings.

The present invention also concerns a method to acquire and process images.

The method of the present invention provides to acquire images by the sensor 31, installed in the helmet 20 in a position suitable to allow images to be acquired substantially at the level of the user's eyes.

The method of the present invention also provides to process the images and convert them into a video data format, suitable for transmission on live TV.

The method to acquire and process images according to the present invention comprises the steps of:
  acquiring images, producing raw signals in output;
  serializing the raw signals, producing in output a serialized stream of signals that can be transmitted even at long distances, for example by means of the connection cable 34 and the data transmission cable 50;
  deserializing the stream of serialized signals and processing the signals, producing video signals in output.

In some embodiments, there can also be a memorization step, in which the video signals are memorized on one or more removable supports.

In some embodiments, there can also be a transmission step, in which the video signals are transmitted in real time to a live TV control center.

The image acquisition step provides that images are acquired by the sensor 31 installed in the helmet 20.

The sensor 31 converts the optical information of the images into electronic information and preprocesses the images.

In the embodiments where the brightness sensor 37 is provided, the brightness sensor 37 may assist the sensor 31 in the image acquisition step, for example tuning the brightness of the acquired images in real time.

This characteristic allows to enhance the quality of the acquired images with respect to the embodiments where the brightness sensor 37 is not provided, and can be advantageous for example to broadcast high quality images on live TV, via streaming, or on the internet through suitable channels.

In some embodiments, the sensor 31 sends the images to the serialization board 33, through the flat cable 32, as raw signals.

In the embodiments where the flat cable 32 is not provided, the serialization board 33 may receive the raw signals directly from the sensor 31 and/or possibly from the brightness sensor 37.

The serialization step provides that the raw signals are made suitable for transfer to the processing board 42.

In particular, the high number of raw signals coming from the sensor 31 is synchronized in a stream of serialized signals, in such a way as to guarantee their integrity during transfer to the processing device 40.

The serialized stream of signals is deserialized and then processed by the processing board 42.

In some embodiments, the deserialization board deserializes the serialized stream of signals and converts it into a signal suitable for the FPGA chip.

The processing step is performed by the processing board 42.

The processing step provides that the deserialized signals are processed to be converted into video data, suitable for transmission on live TV.

The image processing step can also provide to modify in real-time the image parameters through a special software.

In particular, it is possible to modify in real time parameters such as image resolution, video frame rate, image mirror and flip cropping, windowing, and electronic image stabilization.

In these embodiments, the video data can have a quality equal to or greater than 720p, 50 Hz and sub-samples, colors 4:2:2.

In some embodiments, it is also possible to provide a control step for the functioning of the apparatus 10.

The control step can provide to control that all signal streams (raw signals, serialized signals, deserialized signals, video signals) are transmitted correctly inside the apparatus 10 and possibly also to the live TV control center.

It is clear that modifications and/or additions of parts may be made to the apparatus 10, helmet 20 and method as described heretofore, without departing from the field and scope of the present invention.

It is also clear that, although the present invention has been described with reference to some specific examples, a person of skill in the art shall certainly be able to achieve many other equivalent forms of apparatus 10, helmet 20 and method, having the characteristics as set forth in the claims and hence all coming within the field of protection defined thereby.

The invention claimed is:

1. A helmet-based image acquisition and processing system, the system comprising:
   a helmet comprising a liner and at least one aperture that extends at least to the level of a user's eyes;
   an image acquisition device; and
   an image processing device,
   wherein the image acquisition device comprises at least one sensor configured to acquire images and signal transmission means configured to send video signals to the image processing device,
   wherein the liner has a thickness, characterized in that said sensor is positioned on an outermost portion of said thickness visible through said aperture, substantially in correspondence with an edge of said aperture, and oriented to acquire images through said aperture,
   wherein the sensor and the signal transmission means are mounted substantially integrally inside the helmet, and
   wherein the sensor is disposed substantially on a plane extending between the wearer's eyes.

2. The system of claim 1, wherein the helmet comprises a shell, characterized in that the signal transmission means comprise a flat cable and a serialization board, entirely contained inside said shell, and a connection cable, whose first end is connected to said serialization board and whose second end protrudes outwards from the helmet.

3. The system of claim 1, wherein the helmet comprises a shell characterized in that the signal transmission means comprises a serialization board, onto which the sensor is mounted, and a connection cable, substantially contained inside said shell, whose first end is connected to said serialization board and whose second end protrudes outwards from the helmet.

4. The system of claim 1, wherein said image processing device further comprises means for deserializing and processing the images received from the image acquisition device, converting them into video signals, and to manage the electric power supply and functioning of all the components of the apparatus.

5. The system of claim 4, wherein said image processing device includes means to memorize video signals on a removable support.

6. The system of claim 4, wherein said image processing device includes means to transmit the video signals to a live TV control center, in a format suitable for direct TV.

7. The system of claim 1, wherein the sensor is based on Color C-MOS technology.

8. A helmet comprising:
   a shell;
   a liner;
   at least one aperture that extends at least to the level of the user's eyes; and
   an image acquisition device,
   wherein the image acquisition device comprises at least one sensor configured to acquire images and signal transmission means configured to send video signals to external devices,
   wherein the liner has a thickness, characterized in that said sensor is positioned on an outermost portion of said thickness visible through said aperture, substantially in correspondence with an edge of said aperture, and oriented to acquire images through said aperture,
   wherein said sensor and said signal transmission means are mounted substantially integrally inside said helmet, and
   wherein the sensor is disposed substantially on a plane extending between the wearer's eyes.

9. The helmet of claim 8, wherein the helmet further comprises a shell, characterized in that the signal transmission means comprise a flat cable and a serialization board, entirely contained inside the shell, and a connection cable, whose first end is connected to said serialization board and whose second end protrudes outwards from the helmet.

10. The helmet of claim 8, wherein the helmet comprises a shell, characterized in that the signal transmission means comprises a serialization board, onto which the sensor is mounted, and a connection cable, substantially contained inside that shell, whose first end is connected to said serialization board and whose second end protrudes outwards from the helmet.

11. A method to acquire and process images from a sensor, installed in a helmet, and to process said images acquired by the sensor, converting them into a video signal format, suitable to be transmitted on live TV, the method comprising the steps of:
   using the helmet of claim 8:
      acquiring images, producing raw signals in output;
      serializing the raw signals, producing in output a stream of serialized signals that can be transmitted even to long distances;
      transmitting the serialized stream of signals; and
      deserializing the stream of serialized signals and processing the signals, producing video signals in output.

12. The method of claim 11, further comprising a memorization step comprising memorizing the video signals on one or more removable supports.

13. The method of claim 11, further comprising a transmission step comprising transmitting the video signals in real time to a live TV control center.

14. The system of claim 1, wherein the helmet is a motorsports helmet.

15. The helmet of claim 8, wherein the helmet is a motorsports helmet.

16. The method of claim 11, wherein the helmet is a motorsports helmet.

* * * * *